United States Patent
Levy et al.

(10) Patent No.: US 8,543,308 B2
(45) Date of Patent: Sep. 24, 2013

(54) SYSTEMS AND METHODS FOR COMMUNICATING OPTIMAL DRIVING INFORMATION

(75) Inventors: Michael Joseph Levy, Berkeley, MI (US); Alexander Thomas Riegelman, Berkeley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 676 days.

(21) Appl. No.: 12/762,612

(22) Filed: Apr. 19, 2010

(65) Prior Publication Data

US 2011/0257828 A1 Oct. 20, 2011

(51) Int. Cl.
*B60T 7/12* (2006.01)
(52) U.S. Cl.
USPC .......................................................... 701/96
(58) Field of Classification Search
None
See application file for complete search history.

(56) References Cited

U.S. PATENT DOCUMENTS

| | | | |
|---|---|---|---|
| 3,504,337 A | 3/1970 | Ekman | |
| 4,463,427 A | 7/1984 | Bonnetain et al. | |
| 4,523,457 A | 6/1985 | Bayer et al. | |
| 4,542,460 A | 9/1985 | Weber | |
| 5,017,916 A | 5/1991 | Londt et al. | |
| 6,092,021 A | 7/2000 | Ehlbeck et al. | |
| 6,320,500 B1 | 11/2001 | Adelsson et al. | |
| 6,404,332 B1 | 6/2002 | Wakashiro et al. | |
| 6,693,523 B1 | 2/2004 | Abel et al. | |
| 6,888,448 B2 | 5/2005 | Sandberg et al. | |
| 6,985,804 B2 | 1/2006 | Minami | |
| 7,417,532 B2 | 8/2008 | Grill et al. | |
| 7,447,584 B2 | 11/2008 | McMullen | |
| 7,603,228 B2 | 10/2009 | Coughlin | |
| 2002/0062191 A1 | 5/2002 | Yanagisawa | |
| 2007/0088472 A1* | 4/2007 | Ganzhorn et al. | 701/33 |
| 2007/0247291 A1 | 10/2007 | Masuda et al. | |
| 2009/0088960 A1 | 4/2009 | Moll | |
| 2009/0251304 A1 | 10/2009 | Saito et al. | |
| 2010/0030467 A1* | 2/2010 | Wise et al. | 701/204 |
| 2011/0046877 A1* | 2/2011 | Hoffmann | 701/206 |
| 2011/0307165 A1* | 12/2011 | Hiestermann et al. | 701/119 |
| 2011/0307166 A1* | 12/2011 | Hiestermann et al. | 701/119 |

FOREIGN PATENT DOCUMENTS

| | | |
|---|---|---|
| EP | 2105340 | 9/2009 |
| FR | 2757900 | 7/1998 |
| GB | 2457916 | 9/2009 |

* cited by examiner

*Primary Examiner* — Thomas Tarcza
*Assistant Examiner* — Adam Alharbi
(74) *Attorney, Agent, or Firm* — Parks IP Law LLC

(57) ABSTRACT

Systems and methods for communicating optimal driving information through a vehicle display of a vehicle are configured to control position of an actual speed indicator along a scalar element of a display as a function of an actual speed of the vehicle; determine, in response to an actual acceleration of the vehicle, an optimal acceleration for changing vehicle speed; and control position of an optimal speed indicator along the scalar element as a function of the determined optimal acceleration.

20 Claims, 2 Drawing Sheets

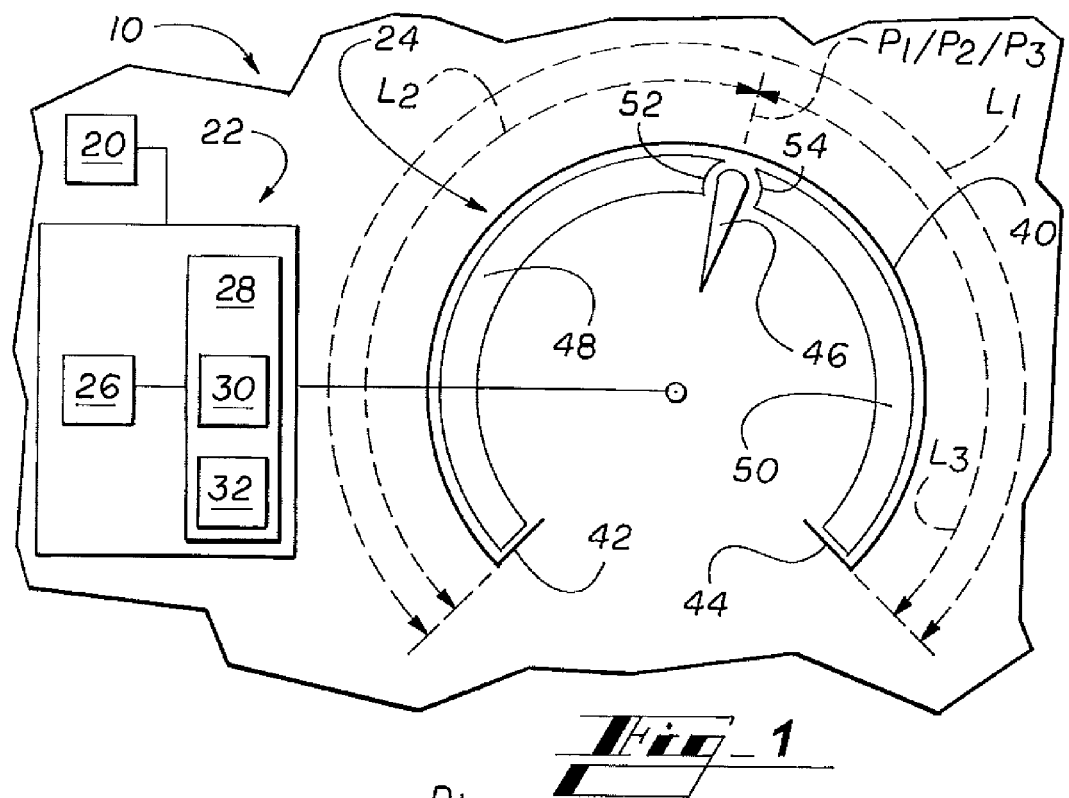
Fig_1
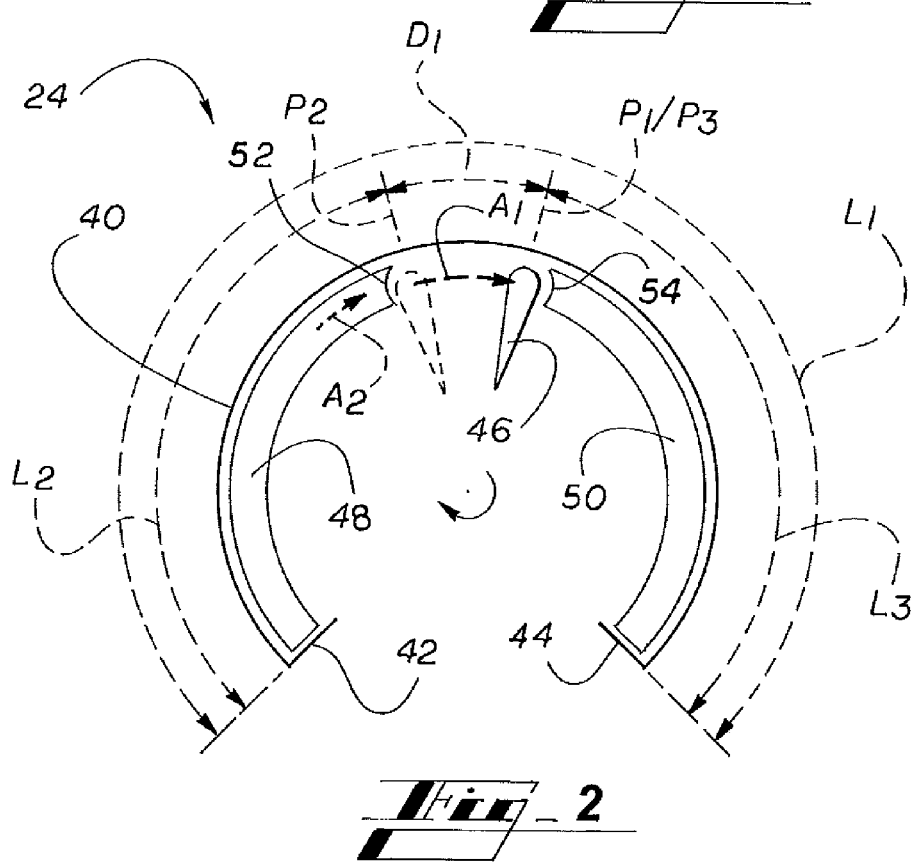
Fig_2

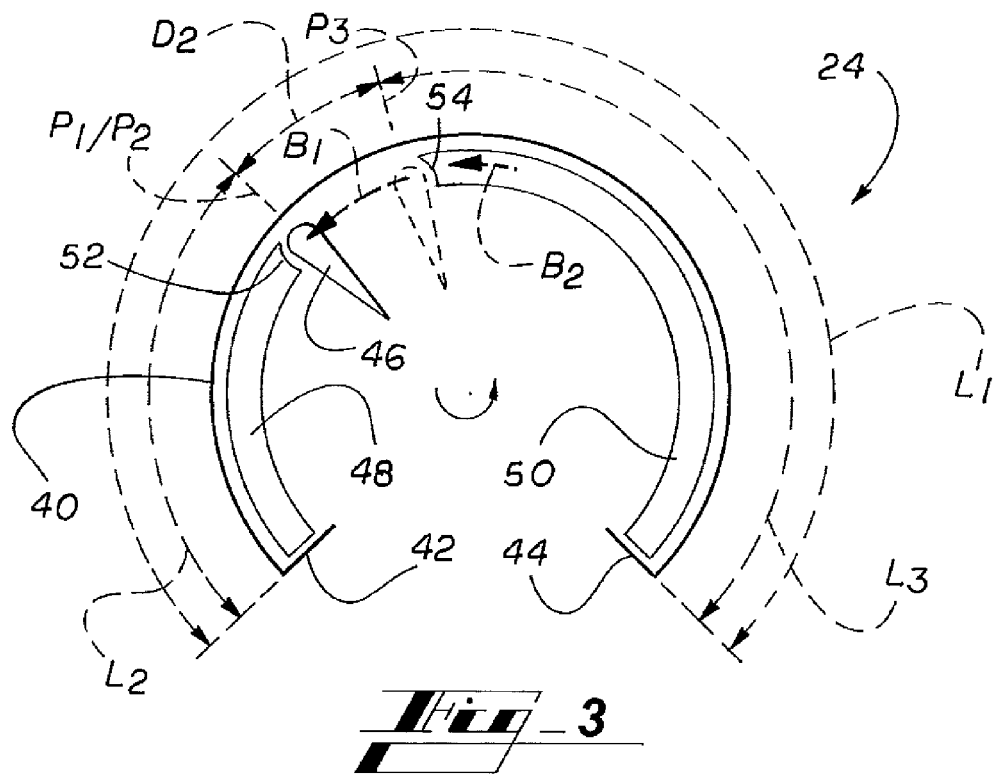
Fig_3
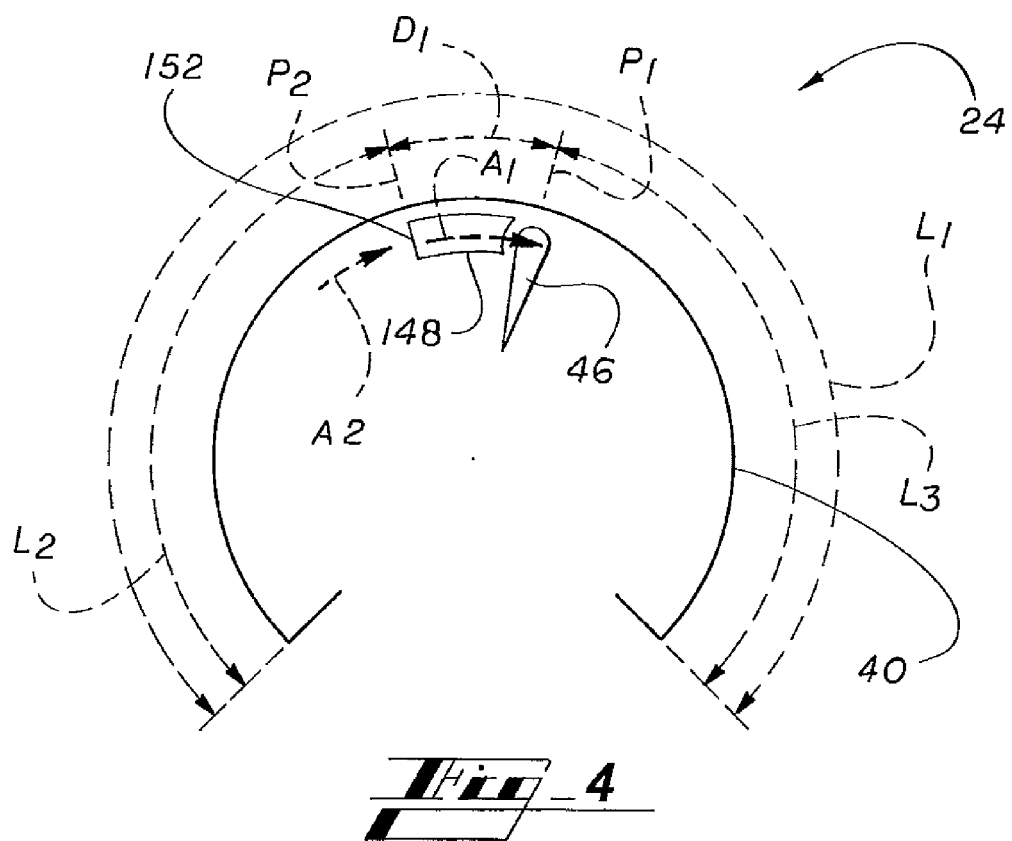
Fig_4

SYSTEMS AND METHODS FOR COMMUNICATING OPTIMAL DRIVING INFORMATION

TECHNICAL FIELD

The present disclosure relates generally to systems and methods for communicating optimal driving information and, more specifically, to systems and methods for communicating optimal driving information by way of vehicle displays.

BACKGROUND

It is desirable for a driver to know how the driver's actions affect certain factors related to operation of the vehicle, including fuel efficiency. Current vehicle displays do not effectively communicate the consequences of a driver's actions. For example, certain displays fail to provide comparative information regarding an optimal state. In displays that provide comparative information, the information is abstract and does not effectively instruct the driver how to achieve an optimal state.

SUMMARY

The various embodiments of the present disclosure provide a vehicle display that effectively communicates to a driver how the driver's actions adhere to or deviate from optimal operation of a vehicle and instructs the driver how to achieve an optimal state.

According to an exemplary embodiment, a vehicle display system for use with a vehicle includes a processor and a memory storing computer-readable instructions. The instructions, when executed by the processor, cause the processor to determine an actual speed of the vehicle; control position of an actual speed indicator along a scalar element of a display as a function of the actual speed; determine, in response to an actual acceleration of the vehicle, an optimal acceleration for changing vehicle speed; and control position of an optimal speed indicator along the scalar element as a function of the determined optimal acceleration.

According to certain embodiments, the optimal speed indicator includes an edge indicating optimal speed and the instructions are configured to cause the processor to control position of the edge of the optimal speed indicator. In some of these embodiments, the optimal speed indicator includes an end fixed in position adjacent an end of the scalar element and extends from the fixed end to the edge. Here, the instructions are configured to cause the processor to control the position of the distal edge, thereby changing a length of the optimal speed indicator. In some of these embodiments, the optimal speed indicator includes an end directly adjacent and moving with the actual speed indicator and extends from the end to the edge. Here, the instructions are configured to cause the processor to control the position of the trailing edge, thereby changing a length of the optimal speed indicator.

According to certain embodiments, the instructions are configured to cause the processor to determine the optimal acceleration as a function of fuel efficiency for the vehicle.

In still other embodiments, the instructions are further configured to cause the processor to determine whether a distance between the actual speed indicator and the optimal speed indicator exceeds a predetermined value and, if the distance between the actual speed indicator and the optimal speed indicator exceeds the predetermined value, affect a feature of the display system. In some of these embodiments, the instructions cause the processor to affect a color of the actual speed indicator as a function of the distance between the actual speed indicator and the optimal speed indicator. In some of these embodiments, the instructions cause the processor to affect a feature that is selected from a group of features consisting of: a color of the actual speed indicator; a brightness of the actual speed indicator; a size of the actual speed indicator; a shape of the actual speed indicator; a dynamic of the actual speed indicator; a color of the optimal speed indicator; a brightness of the optimal speed indicator; and a sound.

The foregoing has broadly outlined some of the aspects and features of the various embodiments, which should be construed to be merely illustrative of various potential applications of the teachings of the disclosure. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 1 is a schematic illustration of a portion of a vehicle including a display, according to an exemplary embodiment of the disclosure.

FIG. 2 is a schematic illustration of the display of FIG. 1 illustrating an exemplary accelerating action.

FIG. 3 is a schematic illustration of the display of FIG. 1 illustrating an exemplary braking action.

FIG. 4 is a schematic illustration of a display, according to another exemplary embodiment of the disclosure.

DETAILED DESCRIPTION

As required, detailed embodiments are disclosed herein. It must be understood that the disclosed embodiments are merely exemplary of the teachings that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

The exemplary embodiments are described in the context of an automobile-type vehicle although it is contemplated that the teachings are similarly applicable to other vehicles, including boats, airplanes, other motorized vehicles, and the like. The exemplary embodiments are described with respect to optimizing fuel efficiency or fuel consumption although it is contemplated that the teachings can be applied similarly to optimize other factors including emissions, noise, safety, the fastest way around a course, combinations of factors, and the like.

Referring to FIG. 1, an exemplary vehicle 10 includes a speed sensor 20, a control unit 22, and a display 24. The speed sensor 20 measures speed of the vehicle 10 and provides a speed measurement to the control unit 22, which controls the display 24. In alternative embodiments, other sensors provide other measurements to the control unit 22 to control the display 24. Such sensors can include acceleration sensors, braking sensors, fuel level sensors, odometers, weight load sensors, ambient temperature sensors, electrical draw sensors, global positioning system (GPS) sensors or other sensors associated with a navigation system (e.g., traffic sensors, weather sensors, topography sensors, etc.), combinations thereof, and the like.

The control unit 22 includes a processor 26 and a memory 28. The memory 28 includes software modules 30, 32 that include computer-executable instructions for controlling elements of the display 24, as described in further detail below. While the system and methods described herein are, at times, described in a general context of computer-executable instructions, the systems and methods of the present disclosure can also be implemented in combination with other program modules and/or as a combination of hardware and software. The term software module, or variants thereof, is used expansively herein to include routines, applications, program modules, programs, components, data structures, algorithms, and the like. Software modules can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

Computer-executable media includes, for example, volatile media, non-volatile media, removable media, and non-removable media. The term computer-executable media and variants thereof, as used in the specification and claims, refer to storage media. In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

Continuing with FIGS. 1-3, the display 24 includes a scalar element 40, a speed indicator referred to as a needle 46, an acceleration arm 48, and a deceleration arm 50. The scalar element 40 represents a range of speeds and includes a lower end 42 and an upper end 44. The needle 46 is configured to mark the speed measured by the speed sensor 20 on the scalar element 40. Each of the arms 48, 50 is an optimal speed element used to represent an optimal change in speed on the scalar element 40 as a function of at least one vehicle-operation factor such as, for example, fuel efficiency. The representation corresponding to vehicle accelerations may be referred to as an acceleration profile, and may be referred to as a deceleration profile in connection with negative accelerations (i.e., decelerations) of the vehicle.

The scalar element 40 has a length L1 and represents spatially the potential speeds of the vehicle 10. The lower end 42 defines a minimum speed and the upper end 44 defines a maximum speed. In some embodiments of the present disclosure, speeds along the length L1 of the scalar element 40 are evenly spaced at a certain interval. The illustrated scalar element 40 is arched although, in alternative embodiments, the scalar element 40 has other shapes, such as a straight line.

The needle 46 is a geometric indicator with a position P1 that is spatially and directly related to the scalar element 40 to represent actual speed of the vehicle 10. The arms 48, 50 are also geometric indicators that are spatially and directly related to the scalar element 40. The illustrated acceleration arm 48 has a length L2 that extends from the lower end 42 of the scalar element 40 to a distal end 52 represented by position P2. During vehicle acceleration, the distal end 52 of the acceleration arm 48 indicates an optimal speed for the vehicle 10, as a function of at least one vehicle-operating factor (e.g., fuel efficiency). As such, movement of the distal end 52, or growth rate of the acceleration arm 48, represents optimal acceleration, or an optimal acceleration profile.

The deceleration arm 50 has a length L3 that extends from the upper end 44 of the scalar element 40 to a distal end 54 represented by position P3. During vehicle braking, the distal end 54 of the deceleration arm 50 indicates an optimal speed for the vehicle, as a function of the at least one vehicle-operating factor. As such, movement of the distal end 54, or growth rate of the deceleration arm 50, represents optimal deceleration. In some embodiments, the distal edges 52, 54 are shaped to conform to a shape of the needle 46, as shown in the figures. In some embodiments, the arms 48, 50, combined, extend generally along the length L1 of the scalar element 40.

The control unit 22 controls the position P1 and movement A1, B1 (shown in FIGS. 2 and 3, respectfully) of the needle 46 on the scalar element 40 as a function of the speed measured by the speed sensor 20. The control unit 22 also sets the position P2, P3 and movement A2, B2 (shown in FIGS. 2 and 3, respectfully) of the arms 48, 50 on the scalar element 40 according to algorithms described in further detail below. Moreover, in some embodiments of the present disclosure, each of the elements 40, 46, 48, 50 are configured to change in ways other than spatially, such as by changing features such as color, brightness, dynamics (e.g., blinking, etc.), shape, size, sound, and the like, according to exemplary embodiments described in further detail below. In some embodiments, at least one of the elements 40, 46, 48, 50 changes in two or more ways.

The display 24 communicates to the driver by the arms 48, 50 directly interacting with the needle 46 on the scalar element 40. By showing the distal edge 52 of the acceleration arm 48 and the distal edge 54 of the deceleration arm 50 are against or immediately adjacent the needle 46 (as shown in FIG. 1) and move with the needle 46, the display 24 communicates to the driver that the driver's actions are within boundaries of optimal acceleration and braking, respectively. For instance, when the vehicle 10 is being accelerated at an optimal rate, the distal edge 52 of the acceleration arm 48 will be positioned directly adjacent the needle 46, and move with the needle 46 as vehicle speed increases. When the vehicle 10 is being decelerated at an optimal rate, the distal edge 54 of the deceleration arm 50 will be positioned directly adjacent the needle 46, and move with the needle 46 as vehicle speed decreases.

When the vehicle is accelerated or decelerated at non-optimal rates (e.g., too rapidly), distal edge 52 of the acceleration arm 48 and the distal edge of the deceleration arm 50, respectively, do not keep up with the needle 46 as the needle 46 moves along the scalar element 40. In this way, the display 24 communicates to the driver that the vehicle 10 is not being accelerated or decelerated at an optimal rate. As such, the driver can easily judge whether the vehicle is accelerating or decelerating optimally or non-optimally. Further, by viewing how their accelerations/decelerations deviate from the optimal acceleration/deceleration profile, the driver can learn how to achieve more optimal accelerations/decelerations in the future.

Referring to FIG. 2, when the driver's actions cause a vehicle acceleration A1 greater than an optimal acceleration A2, the display 24 communicates to the driver that the acceleration A1 is greater than optimal acceleration A2 by showing the needle 46 separated from the distal edge 52 of the acceleration arm 48 by a distance D1. Further, movement of the distal edge 52 of the acceleration arm 48 communicates to the driver where and how the needle 46 would be moving if the vehicle were accelerating at the optimal rate A2 to achieve the higher speed where the needle 46 is positioned. Similarly, referring to FIG. 3, when the driver's actions cause a vehicle deceleration B1 greater than an optimal deceleration B2, the display 24 communicates to the driver that the deceleration B1 is greater than optimal deceleration B2 by showing the needle 46 separated from the distal edge 54 of the deceleration arm 50 by a distance D2. Further, movement of the distal edge 54 of the deceleration arm 50 communicates to the driver where and how the needle 46 would be moving if the vehicle were decelerating at the optimal rate B2.

By showing the distances D1, D2 between the needle 46 and distal edges 52, 54 of the arms 48, 50, the display 24 qualitatively and quantitatively communicates deviation from optimal speeds and, respectfully, accelerations and decelerations. In general, the display 24 communicates deviation from optimal acceleration quantitatively and qualitatively by showing the difference between the acceleration A1 of the needle 46 and the acceleration A2 of the distal edge 52 of the arm 48 (e.g., the growth rate of the distance D1). Similarly, the display 24 communicates deviation from optimal deceleration quantitatively and qualitatively by showing the difference between the deceleration B1 of the needle 46 and the deceleration B2 of the distal edge 54 of the arm 50 (e.g., the growth of the distance D2).

The scalar element 40 provides a reference to put the distances D1, D2 and the rate of change of the distances D1, D2 into context. For example, the scalar element 40 provides a scale from which quantitative amounts are determined. By showing the actual speed, by the needle 46, and the speed indicated by the edges 52, 54, increasing and decreasing along the scalar element 40 during accelerations and decelerations, respectfully, the display 24 communicates to the driver a quantitative difference between the actual and optimal rates of acceleration and deceleration, respectfully.

In some embodiments of the present disclosure, the display 24 communicates deviation from optimal speeds and accelerations/decelerations quantitatively using conventions other than or along with geometric representation. For instance, as provided in more detail below, the display 24 may represent an amount by which vehicle speed deviates from an optimal range of speeds or acceleration/deceleration deviates from optimal acceleration/deceleration by one or more ways, such as by element spatially (e.g., position/movement), color, brightness, dynamics, shape, and size, and by use of one or more sounds.

For example, a driver can easily judge whether they have accelerated or decelerated too quickly simply by viewing whether separation between the needle 46 and edges 52, 54, and thus the distances D1, D2, exist along the length L1 of the scalar element 40. The display 24 may further represent whether the vehicle 10 is deviating from a range of optimal speeds or accelerating/decelerating outside optimal rates by one or more ways including color, brightness, dynamics, and sound.

In some embodiments of the present disclosure, the display 24 communicates deviation from optimal acceleration or deceleration through changes in color, brightness, and/or dynamics of elements 40, 46, 48, 50, along with or instead of communicating deviation with geometric representation. For example, upon separation between the needle 46 and the distal edges 52, 54 of the arms 48, 50, the needle 46 changes color, such as from blue to red. For instance, the control unit 22 may be configured so that the needle is colored blue when the vehicle is accelerating optimally, or within an optimal range, and red when accelerating non-optimally, or outside of the optimal range.

In certain embodiments, the color of the needle 46 is selected along a color spectrum as a function of the deviation distance D1, D2. For example, in some embodiments, the needle 46 changes color from blue to red in three or more stages corresponding to an amount of deviation D1, D2, being the amount by which the vehicle 10 is accelerating/decelerating non-optimally, or outside of the range. The needle 46 would be blue when the needle is not separated from the distal edges 52, 54, representing optimal acceleration/deceleration, and then change color, in stages according to the amount of deviation, from blue to purple, when acceleration is slightly non-optimal, to red when acceleration is greatly non-optimal. In some embodiments, the color changes could be more detailed, such as from blue to indigo, to violet, to purple, to magenta, to lavender, to crimson, to red. In certain embodiments needle 46 color changes between colors other than from blue and red, such as from green to red.

In addition to communicating deviation from optimal driving, the display 24 communicates the acceleration or deceleration that would achieve optimal driving. The display 24, by showing optimal change in speed and thus optimal acceleration/deceleration by movement of the edges 52, 54, instructs the driver what the needle 46 movement should have looked like during the acceleration/deceleration in progress or just occasioned, so that the driver can better understand how to accelerate/decelerate more optimally in the future. By detailed quantitative and qualitative real-time instruction, the display 24 teaches the driver how to improve their driving in a helpful and understandable manner, as compared to, for example, giving the driver a simple indication of good or bad.

As mentioned above, movement of the distal edges 52, 54 and the growth rate of the arms 48, 50 along the scalar element 40 communicate optimal acceleration/deceleration. The driver is able to view the movement of the needle 46 versus the movement suggested by the distal edges 52, 54 and conform present and future accelerations/decelerations more closely to the optimal accelerations/decelerations taught by the distal edges 52, 54.

The software module 30 of the control unit 22 includes computer-executable instructions that include one or more algorithms and, when executed by the processor 26, cause the processor 26 to position and move the distal edges 52, 54 of the arms 48, 50 as described above. Particularly, as mentioned, the control unit 22 receives speed information from the speed sensor 20 of the vehicle 10 and displays the needle 46 along the scalar element 40 accord to the measured speed.

The instructions of the software module 30 also cause the processor 26 to, during vehicle 10 accelerations/decelerations, identify optimal accelerations/decelerations. The instructions cause the processor 26 to communicate optimal accelerations/decelerations, being optimal changes in speed, to the driver by positioning and moving the distal edges 52, 54 along the scalar element 40 according to the identified optimal accelerations/decelerations. The optimal accelerations/decelerations include fixed maximum accelerations/decelerations and accelerations/decelerations that are determined as a function of factors described herein including measured speed.

According to an exemplary algorithm for positioning the arms 48, 50 relative to the needle 46, referring to FIGS. 1 and 2, the control unit 22 determines if the position P2 of the distal edge 52 is less than or equal to the position P1 of the needle 46. Referring to FIG. 1, if the position P2 of the distal edge 52 is equal to the position P1 of the needle 46 so as to be against the needle 46, the current driving actions with respect to acceleration are optimal and the control unit 22 takes no action with respect to positioning the distal edge 52. Referring to FIG. 2, if the position P2 of the distal edge 52 is less than the position P1 of the needle 46, the control unit 22 moves the distal edge 52, increasing the length L2 of the arm 48, toward the needle 46 as a function of a maximum allowable acceleration A2 for optimal driving. Here, the driver observes what an optimal acceleration A2 profile looks like on the scalar element 40 and can compare this to the previous acceleration A1 profile of the needle 46. The position P2 of the distal edge 52 is constrained to be less than or equal to the position P1 of the needle 46. Referring to FIG. 3, when the position P1 of the needle 46 decreases, the distal edge 52 remains against the needle 46 and the length L2 of the arm 48 decreases.

Referring to FIGS. 1 and 3, the control unit 22 determines if the position P3 of the distal edge 54 is greater than or equal to the position P1 of the needle 46. If the position P3 of the distal edge 54 is equal to the position P1 of the needle 46 so as to be against the needle 46, the current driving actions with respect to braking are optimal and the control unit 22 takes no action with respect to the distal edge 54. If the position P3 of the distal edge 54 is greater than the position P1 of the needle 46, the control unit 22 moves the distal edge 54, increasing the length L3 of the arm 50, toward the needle 46 according to a maximum allowable deceleration B2 for optimal driving. Here, the driver observes what an optimal deceleration B2 profile looks like on the scalar element 40 and can compare this to the previous braking B1 profile of the needle 46. The position P3 of the distal edge 54 is constrained to be greater than or equal to the position P1 of the needle 46. Referring to FIG. 2, when the position P1 of the needle 46 increases, the distal edge 54 remains against the needle 46 and the length L3 of the arm 50 decreases.

The software module 32 includes computer-executable instructions that, when executed by the processor 26, cause the processor 26 to change the elements 40, 46, 48, 50 according to various conventions, as described above, including, for example, by spacing (e.g., positioning and movement), color, brightness, size, shape, and/or dynamics. For example, when the distance D1, D2 is greater than a predetermined distance, the needle 46 changes from blue to red. Further, when the position P1 of the needle 46 exceeds a predetermined position on the scalar element 40, the needle 46 changes from blue to red. In some embodiments, the software module 32 includes computer-executable instructions that, when executed by the processor 26, cause the processor 26 to provide sound signals to a sound system (e.g., speaker system; not shown) of the vehicle 10.

Referring to FIG. 4, another exemplary embodiment of a display 24 is illustrated. The display 24 of FIG. 4 is substantially similar to the display 24 of FIG. 2 except that the arms 48, 50 are replaced with their negative component. In other words, the arms 48, 50 are not visible and separation between the arms 48, 50 and the needle 46 is made visible. For reference, the separation space (i.e., D1) is illustrated as a tail 148 with a trailing edge 152 in FIG. 4. In operation, the trailing edge 152 operates like the distal edge 52 of the acceleration arm 48 of the embodiment of FIG. 2. Similarly, separation space (i.e., D2) between the needle 46 and an optimal velocity profile is likewise displayed as a tail (not shown) having a trailing edge corresponding to the distal edge 54 of the deceleration arm 50 of the embodiment of FIG. 2. In another contemplated embodiment, the arms 48, 50 or tail 148 are not displayed, but rather only the edge (corresponding to distal edge 52 and trailing edge 152), such as by a line or other indication.

The above-described embodiments are merely exemplary illustrations of implementations that are set forth for a clear understanding of principles. Variations, modifications, and combinations may be made toof the above-described embodiments may be made without departing from the scope of the claims. All such variations, modifications, and combinations are included herein by the scope of this disclosure and the following claims.

What is claimed is:

1. A vehicle display system for use with a vehicle, the vehicle display system comprising:
   a processor;
   a memory storing instructions that, when executed by the processor, cause the processor to:
   determine an actual speed of the vehicle;
   control a position of an actual speed indicator along a length of a scalar element of a display as a function of the actual speed, wherein the length of the scalar element represents potential speeds of the vehicle;
   determine an optimal acceleration for changing vehicle speed; and
   control a position of an optimal speed indicator along the length of the scalar element as a function of the determined optimal acceleration;
   wherein the instructions, in being configured to cause the processor to control the position of the optimal speed indicator and to control the position of the actual speed indicator, are configured to:
   increase a distance between the optimal speed indicator and the actual speed indicator when the actual acceleration exceeds the optimal acceleration; and
   decrease a distance or maintain a minimum distance between the optimal speed indicator and the actual speed indicator when the actual acceleration does not exceed the optimal acceleration.

2. The vehicle display system of claim 1, wherein the optimal speed indicator includes an edge indicating optimal speed, and the instructions, in being configured to cause the processor to control the position of the optimal speed indicator, are configured to cause the processor to control position of the edge of the optimal speed indicator.

3. The vehicle display system of claim 2, wherein:
   the optimal speed includes an end fixed in position adjacent an end of the scalar element and extending from the fixed end to the edge, the edge being a distal edge of the optimal speed indicator; and
   the instructions, in being configured to cause the processor to control position of the optimal speed indicator, are configured to cause the processor to control the position of the distal edge, thereby changing a length of the optimal speed indicator, measured between the fixed end and the distal edge.

4. The vehicle display system of claim 2, wherein:
   the optimal speed indicator includes an end directly adjacent and moving with the actual speed indicator and extending from the end to the edge, the edge being a trailing edge of the optimal speed indicator; and
   the instructions, in being configured to cause the processor to control position of the optimal speed indicator, are configured to cause the processor to control the position of the trailing edge, thereby changing a length of the optimal speed indicator, measured between the end and the trailing edge.

5. The vehicle display system of claim 1, wherein the instructions, in being configured to cause the processor to determine the optimal acceleration, are configured to cause the processor to determine the optimal acceleration as a function of fuel efficiency for the vehicle.

6. The vehicle display system of claim 1, wherein the instructions are further configured to, when executed by the processor, cause the processor to:
   determine whether a distance between the actual speed indicator and the optimal speed indicator exceeds a predetermined value; and
   if the distance between the actual speed indicator and the optimal speed indicator exceeds the predetermined value, affect a feature of the display system.

7. The vehicle display system of claim 6, wherein the instructions, in being configured to, when executed by the processor, cause the processor to affect the feature of the display system, cause the processor to affect a color of the actual speed indicator as a function of the distance between the actual speed indicator and the optimal speed indicator.

8. The vehicle display system of claim 6, wherein the instructions in being configured to, when executed by the processor, cause the processor to affect the feature of the display system, cause the processor to affect the feature being selected from a group of features consisting of: a color of the actual speed indicator; a brightness of the actual speed indicator; a size of the actual speed indicator; a shape of the actual speed indicator; a dynamic of the actual speed indicator; a color of the optimal speed indicator; a brightness of the optimal speed indicator; and a sound.

9. A method for communicating information with a vehicle display system for use with a vehicle, the method comprising:
   determining an actual speed of the vehicle with a speed sensor;
   displaying position of an actual speed indicator along a length of a scalar element of a display as a function of the actual speed;
   determining an optimal acceleration for changing vehicle speed; and
   displaying position of an optimal speed indicator along the length of the scalar element as a function of the determined optimal acceleration;
   wherein the steps of displaying the position of the optimal speed indicator and displaying the position of the actual speed indicator include:
     displaying an increase in distance between the optimal speed indicator and the actual speed indicator when the actual acceleration exceeds the optimal acceleration; and
     displaying a decrease in distance or a constant minimum distance between the optimal speed indicator and the actual speed indicator when the actual acceleration does not exceed the optimal acceleration.

10. The method of claim 9, wherein the optimal speed indicator includes an edge indicating optimal speed, and the method, in controlling position of the optimal speed indicator, comprises controlling position of the edge of the optimal speed indicator.

11. The method of claim 10, wherein the optimal speed indicator includes an end fixed in position adjacent an end of the scalar element and extending from the fixed end to the edge, the edge being a distal edge of the optimal speed indicator; the method further comprising changing a length of the optimal speed indicator, the length measured between the fixed end and the distal edge.

12. The method of claim 10, wherein the optimal speed indicator includes an end directly adjacent and moving with the actual speed indicator and extending from the end to the edge, the edge being a trailing edge of the optimal speed indicator; the method further comprising changing a length of the optimal speed indicator, the length measured between the end and the trailing edge.

13. The method of claim 9, further comprising determining the optimal acceleration as a function of fuel efficiency for the vehicle.

14. The method of claim 9, further comprising:
   determining whether a distance between the actual speed indicator and the optimal speed indicator exceeds a predetermined value; and
   if the distance between the actual speed indicator and the optimal speed indicator exceeds the predetermined value, affecting a feature of the display system.

15. The method of claim 14, wherein affecting a feature of the display system includes affecting a color of the actual speed indicator as a function of the distance between the actual speed indicator and the optimal speed indicator.

16. The method of claim 14, wherein affecting the feature of the display system includes affecting a feature being selected from a group of features consisting of: a color of the actual speed indicator; a brightness of the actual speed indicator; a size of the actual speed indicator; a shape of the actual speed indicator; a dynamic of the actual speed indicator; a color of the optimal speed indicator; a brightness of the optimal speed indicator; and a sound.

17. A computer-readable medium comprising instructions that, when executed by a processor, cause the processor to:
   determine an actual speed of a vehicle;
   control position of an actual speed indicator along a length of a scalar element of a display as a function of the actual speed;
   determine, in response to an actual acceleration of the vehicle, an optimal acceleration for changing vehicle speed; and
   control position of an optimal speed indicator along the length of the scalar element as a function of the determined optimal acceleration
   wherein the instructions, in being configured to cause the processor to control the position of the optimal speed indicator and to control the position of the actual speed indicator, are configured to:
     increase a distance between the optimal speed indicator and the actual speed indicator when the actual acceleration exceeds the optimal acceleration; and
     decrease a distance or maintain a minimum distance between the optimal speed indicator and the actual speed indicator when the actual acceleration does not exceed the optimal acceleration.

18. The computer-readable medium of claim 17, wherein the optimal speed indicator includes an edge indicating optimal speed, and the instructions, in being configured to cause the processor to control the position of the optimal speed indicator, are configured to cause the processor to control position of the edge of the optimal speed indicator.

19. The computer-readable medium of claim 18, wherein the optimal speed indicator includes an end fixed in position adjacent an end of the scalar element and extending from the fixed end to the edge, the edge being a distal edge of the optimal speed indicator; and
   the instructions, in being configured to cause the processor to control position of the optimal speed indicator, are configured to cause the processor to control the position of the distal edge, thereby changing a length of the optimal speed indicator, measured between the fixed end and the distal edge.

20. The computer-readable medium of claim 18, wherein the optimal speed indicator includes an end directly adjacent and moving with the actual speed indicator and extends from the end to the edge, the edge being a trailing edge of the optimal speed indicator; and the instructions, in being configured to cause the processor to control position of the optimal speed indicator, are configured to cause the processor to control the position of the trailing edge, thereby changing a length of the optimal speed indicator, measured between the end and the trailing edge.

* * * * *